US011929244B2

(12) United States Patent
Cheng et al.

(10) Patent No.: US 11,929,244 B2
(45) Date of Patent: Mar. 12, 2024

(54) COLLISION REACTION CELL ION ACCELERATION APPARATUS WITH EXTREMELY LOW CROSSTALK

(71) Applicant: NANJING QLIFE MEDICAL TECHNOLOGY CO., LTD., Jiangsu (CN)

(72) Inventors: Xiaoliang Cheng, Nanjing (CN); Kejia Zheng, Nanjing (CN)

(73) Assignee: NANJING QLIFE MEDICAL TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/275,557

(22) PCT Filed: Dec. 8, 2021

(86) PCT No.: PCT/CN2021/136276
§ 371 (c)(1),
(2) Date: Aug. 2, 2023

(87) PCT Pub. No.: WO2022/252542
PCT Pub. Date: Dec. 8, 2022

(65) Prior Publication Data

US 2024/0038516 A1 Feb. 1, 2024

(30) Foreign Application Priority Data

Jun. 4, 2021 (CN) ......................... 202121246769.3

(51) Int. Cl.
*H05H 15/00* (2006.01)
*H01J 49/00* (2006.01)
(Continued)

(52) U.S. Cl.
CPC ........ *H01J 49/005* (2013.01); *H01J 49/4225* (2013.01); *H05H 7/22* (2013.01); *H05H 15/00* (2013.01)

(58) Field of Classification Search
CPC ...... H01J 49/005; H01J 49/4225; H05H 1/00; H05H 15/00; H05H 7/22; A61N 2005/1087; A61N 2005/1095
See application file for complete search history.

(56) References Cited

U.S. PATENT DOCUMENTS

2004/0212331 A1 10/2004 Swenson et al.
2018/0247805 A1* 8/2018 Continetti ........... H01J 49/0031

FOREIGN PATENT DOCUMENTS

CN 113301705 A * 8/2021 ........... A61N 5/1001
CN 214960255 U 11/2021
JP H01137549 A 5/1989

OTHER PUBLICATIONS

Yang, Guojun et al., "RF Optimization Design of a 750 keV Radio Frequency Quadrupole Injector", *High Power Laser and Particle Beams*, vol. 20, No. 08, Aug. 31, 2008 (Aug. 31, 2008), ISSN: 1001-4322.

(Continued)

*Primary Examiner* — David E Smith
(74) *Attorney, Agent, or Firm* — Harness, Dickey & Pierce, P.L.C.

(57) ABSTRACT

A collision reaction pool ion acceleration apparatus which has extremely low crosstalk. The apparatus comprises an apparatus body, a vacuum chamber, a first tube bundle channel and a second tube bundle channel. The vacuum chamber is fixedly connected to the interior of the apparatus body; the other end of the interior of the apparatus body is fixedly connected to a first insulation seat. A collision chamber is embeddedly connected to the inside the first insulation seat, and a high-frequency electrode quadrupole (Continued)

lens is fixedly connected to two sides of the collision chamber. When charged ions enter the collision chamber, the high-frequency electrode quadrupole lens focuses on the charged ions, so that the incoming charged ions form a new motion trajectory in the collision chamber, and the charged ions are easily separated from the collision chamber, thereby increasing the working efficiency.

7 Claims, 2 Drawing Sheets

(51) Int. Cl.

| | |
|---|---|
| ***H01J 49/42*** | (2006.01) |
| ***H05H 7/22*** | (2006.01) |

(56) References Cited

OTHER PUBLICATIONS

Lu, Yuanrong et al., "Study of Integral Split Ring Radio Frequency Quadrupole (ISR RFQ) Accelerators", *Nuclear Physics Review*, vol. 15, No. 03, Sep. 30, 1998 (Sep. 30, 1998), ISSN: 1007-4627, pp. 144-149.

Yang, Guojun et al., "Design of water-cooling system for 750keV radio frequency quadrupole injector)", *High Power Laser and Particle Beams*, vol. 20, No. 06, Jun. 15, 2008 (Jun. 15, 2008), ISSN: 1001-4322, pp. 1039-1042.

International Search Report (English and Chinese) and Written Opinion of the ISA (English and Chinese) issued in PCT/CN2021/136276, dated Mar. 9, 2022; ISA/CN.

* cited by examiner

COLLISION REACTION CELL ION ACCELERATION APPARATUS WITH EXTREMELY LOW CROSSTALK

CROSS-REFERENCE TO RELATED APPLICATIONS

This application is a U.S. National Phase Application under 35 U.S.C. 371 of International Application No. PCT/CN2021/136276, filed on Dec. 8, 2021, which claims the benefit of Chinese Patent Application No. 202121246769.3, filed on Jun. 4, 2021. The entire disclosures of the above applications are expressly incorporated by reference herein.

FIELD OF THE INVENTION

The present application relates to the technical field of ion acceleration devices, and in particular, to a collision reaction cell ion acceleration apparatus with extremely low crosstalk

BACKGROUND OF THE INVENTION

The radio frequency quadrupole (RFQ) accelerator was proposed by Soviet scientists in 1969, and is famous all over for successfully accelerating large currents by American scientists in 1984, and is thus popularized. RFQ has four, that is, two sets of symmetrical electrodes. Electrodes in each of the sets of the RFQ have a same potential and voltage, and the two sets have the potentials and the voltages exactly opposite to each other. This enables the RFQ to bunch particles (with a single set of electrodes) while accelerating the particles (the two sets of electrodes work together).

A prior collision reaction cell ion acceleration apparatus with extremely low crosstalk may cause charged ions not to work well during transmission due to low transmission efficiency. Meanwhile, the prior collision reaction cell ion acceleration apparatus with extremely low crosstalk cannot change a motion trajectory of the charged ions well, and as a result, all of the charged ions in the apparatus cannot be transmitted, which reduces working efficiency of the apparatus. Therefore, how to design a collision reaction cell ion acceleration apparatus with extremely low crosstalk becomes a problem to be resolved at present.

SUMMARY OF THE INVENTION

An objective of the present disclosure is to provide a collision reaction cell ion acceleration apparatus with extremely low crosstalk, to resolve a problem that the collision reaction cell ion acceleration apparatus with extremely low crosstalk provided in the background of the invention cannot perform transmission well and cannot adjust a motion trajectory of charged ions.

To achieve the foregoing objective, the present disclosure provides the following technical solutions. A collision reaction cell ion acceleration apparatus with extremely low crosstalk, including an apparatus body, a vacuum cavity, a first tube bundle channel, and a second tube bundle channel. The vacuum cavity is fixedly connected into an inner portion of the apparatus body. The first tube bundle channel is insertedly connected into a top portion of the apparatus body on a side. A drift tube support rod is fixedly connected on another side of the inner portion of the apparatus body. A middle portion of the drift tube support rod is fixedly connected to a drift tube. A radio-frequency quadrupole electrode support rod is fixedly connected on one side of the inner portion of the apparatus body. A top portion of the radio-frequency quadrupole electrode support rod is fixedly connected to a parallel support contact component. A radio-frequency quadrupole electrode is insertedly connected into the parallel support contact component on a side. A perpendicular support contact component is fixedly connected on another side of the radio-frequency quadrupole electrode. A first insulation base is fixedly connected at another end of the inner portion of the apparatus body. A collision chamber is insertedly connected into an inner portion of the first insulation base. High-frequency electric quadrupole lenses are fixedly connected on both sides of the collision chamber. An electrode-rod electrode is fixedly connected on another side of the first insulation base. The second tube bundle channel is fixedly connected at a bottom portion of the first tube bundle channel. A plug-in slot is embeddedly connected at a middle portion of the inner portion of the first insulation base.

Optionally, T-shaped plates are fixedly connected on both sides of the inner portion of the apparatus body.

Optionally, a second insulation base is fixedly connected on the other side of the electrode-rod electrode.

Optionally, ventholes are embeddedly connected around the inner portion of the apparatus body.

Optionally, the radio-frequency quadrupole electrode, the parallel support contact component, the radio-frequency quadrupole electrode support rod, the perpendicular support contact component, and an acceleration gap together form a fast transmission mechanism.

Optionally, the high-frequency electric quadrupole lens, the first insulation base, the collision chamber, and the electrode-rod electrode together form an acceleration mechanism.

Compared with the prior art, the present disclosure has the following beneficial effects.

1. Regarding the collision reaction cell ion acceleration apparatus with extremely low crosstalk, during transmission, due to a field of an electrode electric field formed in the acceleration gap on an outer side of the radio-frequency quadrupole electrode, the charged ions can be accelerated during transmission. Subsequently, the transmitted charged ions pass through the drift tube, and an electric field in the drift tube becomes a positive electric field, so that the charged ions are in an accelerated state while being transmitted within the entire apparatus body, and accordingly the charged ions in the apparatus body can be quickly transmitted, thereby improving power transmission efficiency of the apparatus.

2. Regarding the collision reaction cell ion acceleration apparatus with extremely low crosstalk, after fully reacting with a collision gas, the entered charged ions moving irregularly may form a new motion trajectory in the collision chamber. In this way, the charged ions can easily go out of the collision chamber, so that the charged ions can be well transmitted to the electrode-rod electrode, thereby improving working efficiency of the apparatus.

BRIEF DESCRIPTION OF THE DRAWINGS

To more clearly describe the technical solutions of the present application, the accompanying drawings for illustrating the embodiments are briefly described below. Obviously, persons of ordinary skills in the art can further derive other accompanying drawings according to these accompanying drawings without an effective effort.

Figure 1:
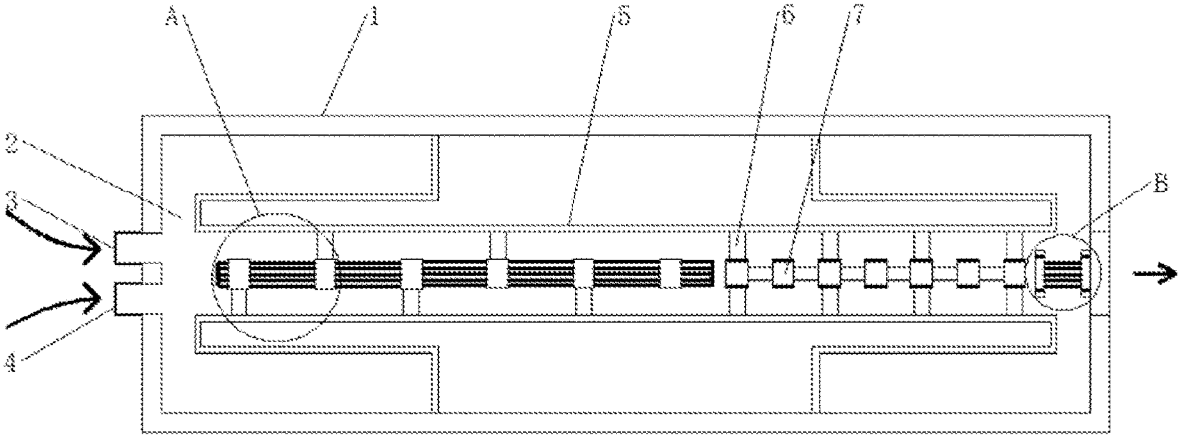
FIG. 1 is a schematic diagram of a structure of an apparatus body according to the present disclosure.

In the figures: 1. apparatus body; 2. vacuum cavity; 3. first tube bundle channel; 4. second tube bundle channel; 5. T-shaped plate; 6. drift tube support rod; 7. drift tube; 8. parallel support contact component; 9. radio-frequency quadrupole electrode support rod; 10. radio-frequency quadrupole electrode; 11. perpendicular support contact component; 12. acceleration gap; 13. first insulation base; 14. high-frequency electric quadrupole lens; 15. electrode-rod electrode; 16. second insulation base; 17. collision chamber; 18. plug-in slot; 19. venthole.

DETAILED DESCRIPTION OF THE EMBODIMENTS

Embodiments are described below in detail, and examples thereof are shown in the accompanying drawings. When the descriptions below relate to the accompanying drawings, unless otherwise stated, same reference numerals throughout various accompanying drawings indicate same or similar elements. Implementations described in the following embodiments represent not all of implementations in accordance with the present application, and just examples of a system and a method that are described in detail in the claims and in accordance with some aspects of the present application.

Figure 2:
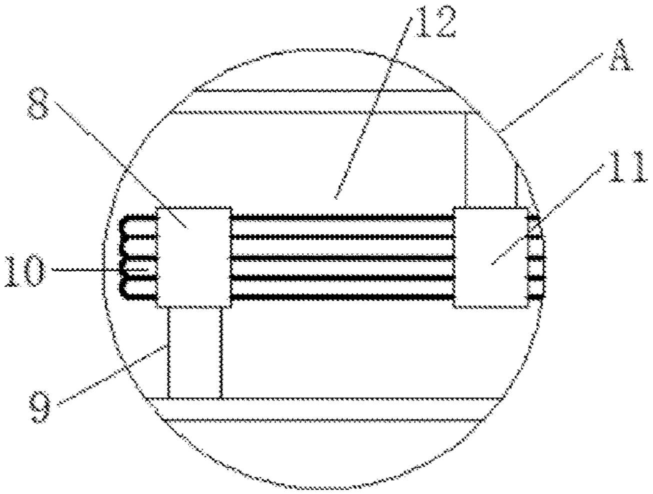
FIG. 2 is a schematic diagram of an enlarged structure at a position A according to the present disclosure.
Figure 3:
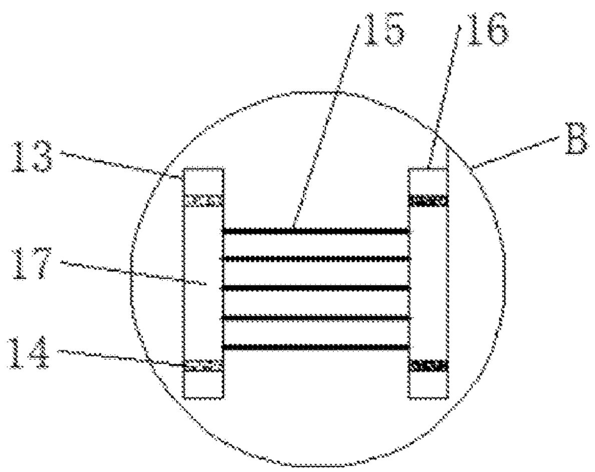
FIG. 3 is a schematic diagram of an enlarged structure at a position B according to the present disclosure.
Figure 4:
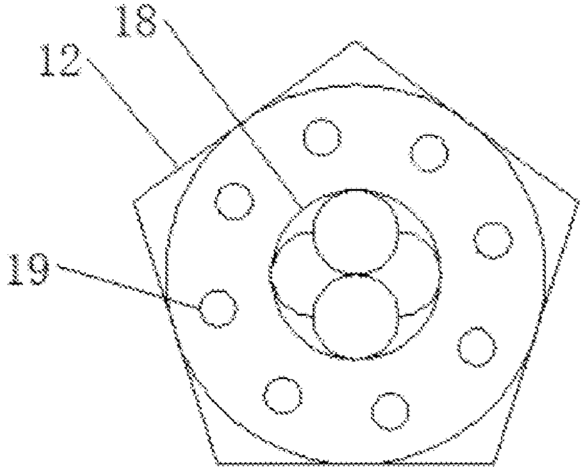
FIG. 4 is a schematic diagram of a side-view structure of a first insulation base according to the present disclosure.

Referring to FIG. 1 to FIG. 4, the present disclosure provides a technical solution: A collision reaction cell ion acceleration apparatus with extremely low crosstalk, including an apparatus body 1, a vacuum cavity 2, a first tube bundle channel 3, and a second tube bundle channel 4. The vacuum cavity 2 is fixedly connected into an inner portion of the apparatus body 1. The first tube bundle channel 3 is insertedly connected into a top portion of the apparatus body 1 on a side. A drift tube support rod 6 is fixedly connected on another side of the inner portion of the apparatus body 1. A middle portion of the drift tube support rod 6 is fixedly connected to a drift tube 7. A radio-frequency quadrupole electrode support rod 9 is fixedly connected on one side of the inner portion of the apparatus body 1. A top portion of the radio-frequency quadrupole electrode support rod 9 is fixedly connected to a parallel support contact component 8. A radio-frequency quadrupole electrode 10 is insertedly connected into the parallel support contact component 8 on a side. A perpendicular support contact component 11 is fixedly connected on another side of the radio-frequency quadrupole electrode 10. A first insulation base 13 is fixedly connected at another end of the inner portion of the apparatus body 1. A collision chamber 17 is embeddedly connected into an inner portion of the first insulation base 13. High-frequency electric quadrupole lenses 14 are fixedly connected on both sides of the collision chamber 17. An electrode-rod electrode 15 is fixedly connected on another side of the first insulation base 13. The second tube bundle channel 4 is fixedly connected at a bottom portion of the first tube bundle channel 3. A plug-in slot 18 is embeddedly connected at a middle portion of the inner portion of the first insulation base 13.

Optionally, T-shaped plates 5 are fixedly connected on both sides of the inner portion of the apparatus body 1. When a user uses the apparatus body 1 for work, ions entering the apparatus body 1 may cause the apparatus body 1 to shake when performing acceleration operation. As a result, the irons cannot be well received by the radio-frequency quadrupole electrode 10, resulting in a change in a transmission path of the ions. Therefore, the user can use the T-shaped plate 5, because the radio-frequency quadrupole electrode support rod 9 is connected to the T-shaped plate 5 and the T-shaped plate 5 supports the apparatus body 1, so that the apparatus body 1 would not shift during operation, thereby greatly improving a support effect for the apparatus.

Optionally, a second insulation base 16 is fixedly connected on the other side of the electrode-rod electrode 15. During operation of the apparatus body 1, because a strong voltage is transmitted to the electrode-rod electrode 15 for work, a problem of burnout by an electric shock may occur to the apparatus body 1 due to the ions transmission in the apparatus body 1. Therefore, the user can provide a base for the fixed electrode-rod electrode 15 as an insulated base, so that when the electrode-rod electrode 15 is disposed on the first insulation base 13 and the second insulation base 16 on both sides thereof, no electric shock would occur when charged ions are transmitted through the electrode-rod electrode 15, which greatly improves service life of the apparatus body 1 and an insulation effect of the apparatus.

Optionally, ventholes 19 are embeddedly connected around the inner portion of the apparatus body 1. When the ions in the apparatus body 1 are transmitted to the collision chamber 17, the user can inject nitrogen gas through the venthole 19 to serve as collision gas that works with the ions. Thus, when the ions start to collide with the collision gas, the apparatus body 1 may make a motion trajectory of the ions more stable, thereby greatly improving stability of the apparatus.

Optionally, the radio-frequency quadrupole electrode 10, the parallel support contact component 8, the radio-frequency quadrupole electrode support rod 9, the perpendicular support contact component 11, and an acceleration gap 12 together form a fast transmission mechanism. When entering the vacuum cavity 2 from the first tube bundle channel 3 and the second tube bundle channel 4 on the apparatus body 1, the charged ions are received by the radio-frequency quadrupole electrode 10 and then are transmitted. Meanwhile, during transmission, transmission may be performed stably through the radio-frequency quadrupole electrode 10 connected to the parallel support contact component 8 and the perpendicular support contact component 11. Meanwhile, during transmission, due to a field of an electrode electric field formed in the acceleration gap on an outer side of the radio-frequency quadrupole electrode 10, the charged ions can be accelerated during transmission. Subsequently, the transmitted charged ions pass through the drift tube 7, and an electric field in the drift tube 7 becomes a positive electric field, so that the charged ions are in an accelerated state while being transmitted within the entire apparatus body 1, and accordingly the charged ions in the apparatus body 1 can be quickly transmitted, thereby greatly improving power transmission efficiency of the apparatus.

Optionally, the high-frequency electric quadrupole lens 14, the first insulation base 13, the collision chamber 17, and the electrode-rod electrode 15 together form an acceleration mechanism. When the charged ions in the apparatus body 1 are transmitted to the collision chamber 17 in the first insulation base 13, the high-frequency electric quadrupole lens 14 in the collision chamber 17 can focus the charged ions transmitted from the drift tube 7 when the charged ions enter the collision chamber 17. Thus, irregular charged ions can better enter the collision chamber 17. The charged ions entering the collision chamber 17 can effectively eliminate neutral molecules and photons through collision of the collision gas. Moreover, after fully reacting with the collision gas, the entered charged ions moving irregularly may form a new motion trajectory in the collision chamber 17. In this way, the charged ions can easily go out of the collision chamber 17, so that the charged ions can be well transmitted to the electrode-rod electrode 15. In this way, the charged ions entering the apparatus body 1 can be transmitted out of the apparatus body 1 quickly, thereby improving working efficiency of the apparatus.

Operating principle: First, the T-shaped plates 5 are provided. When the user uses the apparatus body 1 for work, the ions entering the apparatus body 1 may cause the apparatus body 1 to shake when performing acceleration operation. As a result, the irons cannot be well received by the radio-frequency quadrupole electrode 10, resulting in a change in a transmission path of the ions. Therefore, the user can use the T-shaped plate 5, because the radio-frequency quadrupole electrode support rod 9 is connected to the T-shaped plate 5 and the T-shaped plate 5 supports the apparatus body 1, so that the apparatus body 1 would not shift during operation, thereby greatly improving the support effect for the apparatus.

Subsequently, the second insulation base 16 is provided. During operation of the apparatus body 1, because a strong voltage is transmitted to the electrode-rod electrode 15 for work, the problem of burnout by an electric shock may occur to the apparatus body 1 due to the ions transmission in the apparatus body 1. Therefore, the user can provide the base for the fixed electrode-rod electrode 15 as an insulated base, so that when the electrode-rod electrode 15 is disposed on the first insulation base 13 and the second insulation base 16 on the both sides thereof, no electric shock would occur when the charged ions are transmitted through the electrode-rod electrode 15, which greatly improves the service life of the apparatus body 1 and the insulation effect of the apparatus.

Subsequently, the ventholes 19 are provided. When the ions in the apparatus body 1 are transmitted to the collision chamber 17, the user can inject the nitrogen gas through the venthole 19 to serve as the collision gas that works with the ions. Thus, when the ions start to collide with the collision gas, the apparatus body 1 may make the motion trajectory of the ions more stable, thereby greatly improving the stability of the apparatus.

Subsequently, the radio-frequency quadrupole electrode 10 is provided. When entering the vacuum cavity 2 from the first tube bundle channel 3 and the second tube bundle channel 4 on the apparatus body 1, the charged ions are received by the radio-frequency quadrupole electrode 10 and then are transmitted. Meanwhile, during transmission, transmission may be performed stably through the radio-frequency quadrupole electrode 10 connected to the parallel support contact component 8 and the perpendicular support contact component 11. Meanwhile, during transmission, due to the field of the electrode electric field formed in the acceleration gap on the outer side of the radio-frequency quadrupole electrode 10, the charged ions can be accelerated during transmission. Subsequently, the transmitted charged ions pass through the drift tube 7, and the electric field in the drift tube 7 becomes a positive electric field, so that the charged ions are in an accelerated state while being transmitted within the entire apparatus body 1, and accordingly the charged ions in the apparatus body 1 can be quickly transmitted, thereby greatly improving the power transmission efficiency of the apparatus.

Finally, the high-frequency electric quadrupole lenses 14 are provided. When the charged ions in the apparatus body 1 are transmitted to the collision chamber 17 in the first insulation base 13, the high-frequency electric quadrupole lens 14 in the collision chamber 17 can focus the charged ions transmitted from the drift tube 7 when the charged ions enter the collision chamber 17. Thus, the irregular charged ions can better enter the collision chamber 17. The charged ions entering the collision chamber 17 can effectively eliminate the neutral molecules and the photons through the collision of the collision gas. Moreover, after fully reacting with the collision gas, the entered charged ions moving irregularly may form a new motion trajectory in the collision chamber 17. In this way, the charged ions can easily go out of the collision chamber 17, so that the charged ions can be well transmitted to the electrode-rod electrode 15. In this way, the charged ions entering the apparatus body 1 can be transmitted out of the apparatus body 1 quickly, thereby improving the working efficiency of the apparatus. This is the operating principle of the collision reaction cell ion acceleration apparatus with extremely low crosstalk.

For similar parts between the embodiments provided in the present application, reference can be made to each other. The specific implementations described above are merely some examples under a general concept of the present application, and do not constitute any limitation to the protection scope of the present application. For a person skilled in the art, any other implementations derived, without an effective effort, according to the solutions of the present application fall within the protection scope of the present application.

What is claimed is:

1. A collision reaction cell ion acceleration apparatus with extremely low crosstalk, comprising an apparatus body, a vacuum cavity, a first tube bundle channel, and a second tube bundle channel, wherein the vacuum cavity is fixedly connected into an inner portion of the apparatus body; the first tube bundle channel is insertedly connected into a top portion of the apparatus body on a side; a drift tube support rod is fixedly connected on another side of the inner portion of the apparatus body; a middle portion of the drift tube support rod is fixedly connected to a drift tube; a radio-frequency quadrupole electrode support rod is fixedly connected on one side of the inner portion of the apparatus body; and a top portion of the radio-frequency quadrupole electrode support rod is fixedly connected to a parallel support contact component;

a radio-frequency quadrupole electrode is insertedly connected into the parallel support contact component on a side;

a perpendicular support contact component is fixedly connected on another side of the radio-frequency quadrupole electrode;

a first insulation base is fixedly connected at another end of the inner portion of the apparatus body, and a collision chamber is embeddedly connected into an inner portion of the first insulation base;

high-frequency electric quadrupole lenses are fixedly connected on both sides of the collision chamber; and an electrode-rod electrode is fixedly connected on another side of the first insulation base.

2. The collision reaction cell ion acceleration apparatus with extremely low crosstalk according to claim 1, wherein the second tube bundle channel is fixedly connected at a bottom portion of the first tube bundle channel, and a plug-in slot is embeddedly connected at a middle portion of the inner portion of the first insulation base.

3. The collision reaction cell ion acceleration apparatus with extremely low crosstalk according to claim 1, wherein T-shaped plates are fixedly connected on both sides of the inner portion of the apparatus body.

4. The collision reaction cell ion acceleration apparatus with extremely low crosstalk according to claim 1, wherein a second insulation base is fixedly connected on the other side of the electrode-rod electrode.

5. The collision reaction cell ion acceleration apparatus with extremely low crosstalk according to claim 1, wherein ventholes are embeddedly connected around the inner portion of the apparatus body.

6. The collision reaction cell ion acceleration apparatus with extremely low crosstalk according to claim 1, wherein the radio-frequency quadrupole electrode, the parallel support contact component, the radio-frequency quadrupole electrode support rod, the perpendicular support contact component, and an acceleration gap together form a fast transmission mechanism.

7. The collision reaction cell ion acceleration apparatus with extremely low crosstalk according to claim 1, wherein the high-frequency electric quadrupole lens, the first insulation base, the collision chamber, and the electrode-rod electrode together form an acceleration mechanism.

* * * * *